United States Patent
Sanderovich et al.

(10) Patent No.: US 10,623,074 B2
(45) Date of Patent: Apr. 14, 2020

(54) FAST TRAINING ON MULTI-ANTENNA SYSTEMS

(71) Applicant: QUALCOMM Incorporated, San Diego, CA (US)

(72) Inventors: Amichai Sanderovich, Atlit (IL); Gal Basson, Haifa (IL); Alecsander Petru Eitan, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/211,726

(22) Filed: Dec. 6, 2018

(65) Prior Publication Data
US 2019/0109624 A1    Apr. 11, 2019

Related U.S. Application Data

(62) Division of application No. 15/861,259, filed on Jan. 3, 2018, now Pat. No. 10,361,761.
(Continued)

(51) Int. Cl.
*H04L 1/02* (2006.01)
*H04B 7/06* (2006.01)
(Continued)

(52) U.S. Cl.
CPC ......... *H04B 7/0615* (2013.01); *H04B 7/0408* (2013.01); *H04B 7/0695* (2013.01); *H04J 3/0638* (2013.01); *H04W 88/085* (2013.01)

(58) Field of Classification Search
CPC ..... H04L 27/2647; H04L 1/0618; H04L 1/06; H04B 1/0618; H04B 7/0669; H04B 7/0615; H04B 7/0408
(Continued)

(56) References Cited

U.S. PATENT DOCUMENTS 7,145,940 B2    12/2006  Gore et al.
8,340,232 B2    12/2012  Ding et al.
(Continued)

FOREIGN PATENT DOCUMENTS

EP    2890030 A1    7/2015

OTHER PUBLICATIONS

International Search Report and Written Opinion—PCT/US2018/012465—ISA/EPO—dated Apr. 23, 2018.
(Continued)

*Primary Examiner* — Khai Tran
(74) *Attorney, Agent, or Firm* — Patterson & Sheridan, L.L.P.

(57) ABSTRACT

Certain aspects of the present disclosure relate to methods and apparatus for performing beamforming training in multi-antenna wireless devices. For example, an apparatus for wireless communication may include a first interface configured to obtain, from each of a plurality of radio frequency (RF) modules, a first information regarding detection of one or more pilot signals via at least one antenna element at a respective one of the plurality of RF modules. The apparatus may also include a processing system configured to process the first information obtained from the plurality of RF modules to generate second information to synchronize the plurality of RF modules, and a second interface configured to provide the second information to the plurality of RF modules.

18 Claims, 15 Drawing Sheets

Related U.S. Application Data

(60) Provisional application No. 62/445,226, filed on Jan. 11, 2017.

(51) Int. Cl.
  *H04B 7/0408* (2017.01)
  *H04J 3/06* (2006.01)
  *H04W 88/08* (2009.01)

(58) Field of Classification Search
  USPC .................................................. 375/267, 299
  See application file for complete search history.

(56) References Cited

U.S. PATENT DOCUMENTS

| | | | |
|---|---|---|---|
| 9,191,079 B2 | 11/2015 | Wu et al. | |
| 9,344,165 B2 | 5/2016 | Wang | |
| 9,473,181 B1 | 10/2016 | Takano et al. | |
| 2012/0307695 A1* | 12/2012 | Yehezkely | H01P 5/20 370/310 |
| 2014/0185551 A1 | 7/2014 | Sanderovich et al. | |
| 2016/0323840 A1 | 11/2016 | Feng et al. | |
| 2017/0223639 A1* | 8/2017 | Golan | H04W 52/248 |
| 2017/0230920 A1* | 8/2017 | Shwartz | H04B 17/345 |
| 2017/0280405 A1 | 9/2017 | Feng et al. | |
| 2018/0198503 A1 | 7/2018 | Sanderovich et al. | |
| 2018/0367198 A1* | 12/2018 | Jian | H01Q 3/42 |

OTHER PUBLICATIONS

Li Y., "Simplified Channel Estimation for OFDM Systems with Multiple Transmit Antennas", IEEE Transactions on Wireless Communications, vol. 1, No. 1, Jan. 2002, pp. 67-75.

* cited by examiner

|  | All IQ sent to M. Track is done only on the M | All IQ sent to M. Track is done by the RF Phases determined by M | Only Gain for 16 taps sent Track is done by the RF Phases determined by RF |
| --- | --- | --- | --- |
| RFC payload per RF [excl. sync stage] | →16x64x(4+4)=1KBytes [64us]<br>←32*(2+3) = 20Bytes | →16x32x(4+4)=0.5KBytes [32us]<br>←32*(2+3) = 20Bytes | →16x (4)=32Bytes<br>←4 (best tap)+10 (sync phase)+10(sync gain)= 3Bytes |
| Track Performance | Best [high SNR] | Good, same as suggested Issues with non-uniform arrays | Good, same as suggested Issues with non-uniform arrays |
| Sector Select Performance | Good | Good | Issues for non-uniform arrays |
| Combining RF performance | Best | Good- | Good |
| Complexity at M | High | Med | Med |
| Complexity at RF | Med | Med | High |

FIG. 12

FAST TRAINING ON MULTI-ANTENNA SYSTEMS

CLAIM OF PRIORITY UNDER 35 U.S.C. § 119

The present Application for Patent is a divisional application of U.S. patent application Ser. No. 15/861,259, filed Jan. 3, 2018 which claims benefit of U.S. Provisional Patent Application Ser. No. 62/445,226, filed Jan. 11, 2017, each of which is assigned to the assignee hereof and hereby expressly incorporated by reference herein.

BACKGROUND

Field of the Disclosure

The present disclosure relates generally to wireless communication, and more particularly, to methods and apparatus to reduce time of beamforming training for multi-antenna systems.

Description of Related Art

The 60 GHz band is an unlicensed band which features a large amount of bandwidth and a large worldwide overlap. The large bandwidth means that a very high volume of information can be transmitted wirelessly. As a result, multiple applications, that use transmission of a large amount of data, can be developed to allow wireless communication around the 60 GHz band. Examples for such applications include, but are not limited to, wireless high definition TV (HDTV), wireless docking stations, wireless Gigabit Ethernet, and many others.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a first interface configured to obtain, from each of a plurality of radio frequency (RF) modules, first information regarding detection of one or more pilot signals via at least one antenna element at a respective one of the RF modules, a processing system configured to process the first information obtained from the plurality of RF modules to generate second information to synchronize the RF modules, and a second interface configured to provide the second information to the RF modules.

Certain aspects of the present disclosure provide an apparatus for wireless communications. The apparatus generally includes a detector configured to detect one or more pilot signals via at least one activated antenna element, a first interface configured to provide, to a processing module, first information regarding the detection of the one or more pilot signals via the at least one activated antenna element, a second interface configured to obtain, from the processing module, second information generated at least based on the first information, and a processing system configured to make adjustments to components of the RF module based on the second information.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 illustrates different feedback from RF modules during training of a multi-antenna system, in accordance with certain aspects of the present disclosure.

DETAILED DESCRIPTION

Figure 1:
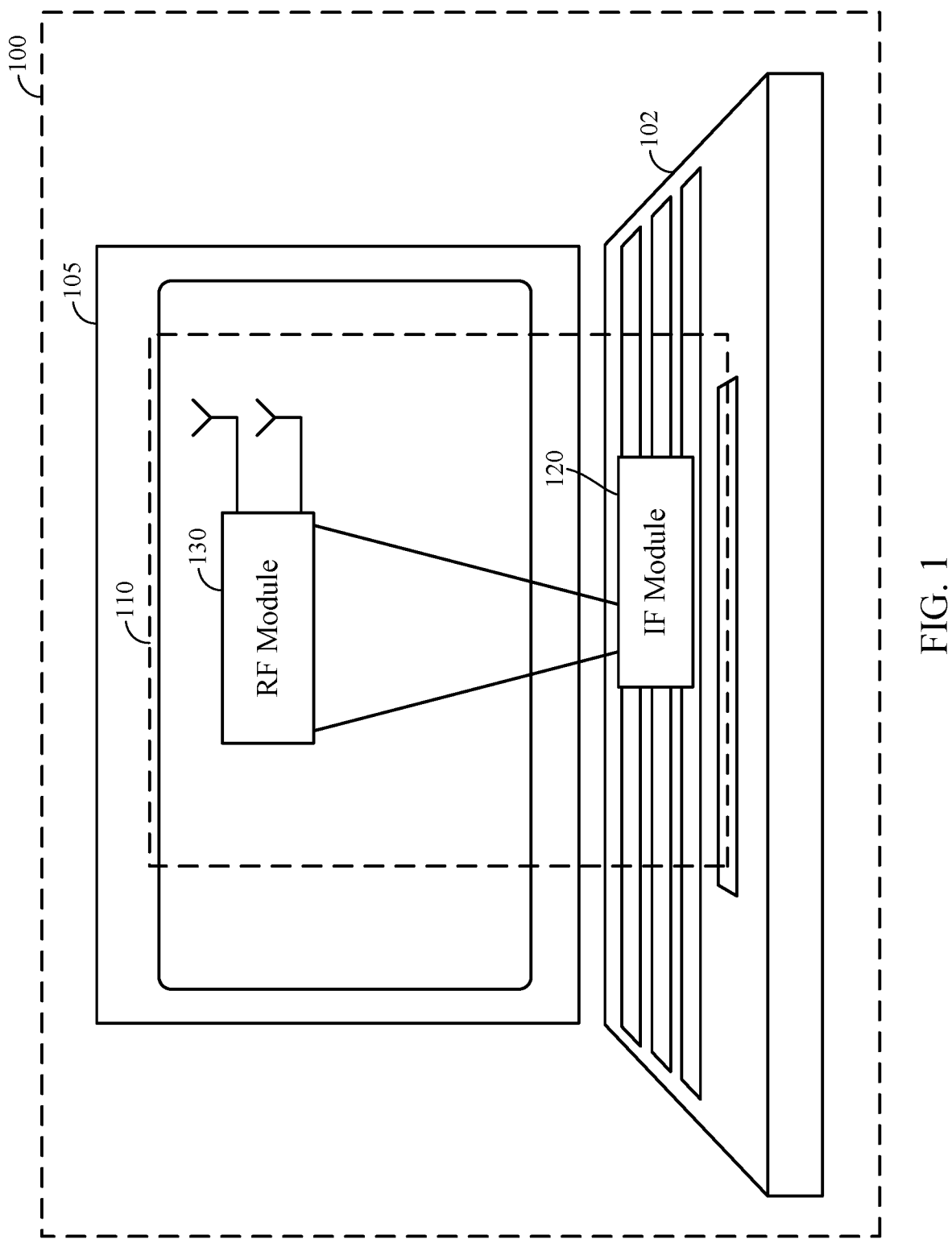
FIG. 1 illustrates an example laptop computer having radio transmission capabilities, in accordance with certain aspects of the present disclosure.

Certain aspects of the present disclosure provide improved techniques for beamforming training of multi-antenna systems. The techniques may help substantially reduce the time needed for beamforming training by simultaneously training multiple antennas.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of RF communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 illustrates an example laptop computer 100 that includes an RF system 110 for transmission and reception of signals. The form factor of the RF system 110 is spread between the base 102 and lid planes 105 of the laptop computer 100.

The RF system 110 includes a baseband module 120 and a radio frequency (RF) module 130 respectively connected to the base plane 102 and lid plane 105. The RF module 130 is coupled to active transmit (TX) and receive (RX) antennas. The TX and RX antennas may be one or more active antennas in an antenna array (e.g., a phased antenna array). When transmitting signals, the baseband module 120 may provide the RF module 130 with a control signal, and one or more other signals such as a local oscillator (LO), intermediate frequency (IF). The control signal may be used for functions, such as gain control, RX/TX switching, power level control, sensors, and detectors readouts. Specifically, beam-forming based RF systems may use high frequency beam steering operations which are performed under the control of the baseband module 120. The control typically originates at the baseband 120 of the system, and transfers between the baseband module 120 and RF module 130.

The RF module 130 may perform up-conversion, using a mixer (not shown) on the IF signal(s) to RF signals and then transmits the RF signals through the TX antenna according to the control of the control signals. A power signal such as a DC voltage signal may be used to power the various components of the RF module 130.

In the receive direction, the RF module 130 receives RF signals (e.g., at the frequency band of 60 GHz), through the active RX antenna and performs down-conversion, using a mixer, to IF signals using the LO signals, and sends the IF signals to baseband module 120. The operation of the RF module 130 is controlled by the control signal, but certain control information (e.g., feedback signal) is sent back to the baseband module 120.

In some cases, at least two cables (transmission lines) may be used to transfer the IF, LO, and control signals between the baseband and RF modules 120 and 130.

The drawback to this approach is especially critical in millimeter-wave RF systems, e.g., systems that operate in the 60 GHz frequency bands, as the RF module 130 may be located close to the active antennas to perform the functions described above in order to reduce the power loss of the received and transmit signals. Thus, the baseband module 120 is located apart from the RF module 130. Further, because transferring high frequency signals over the cables significantly attenuates the signals, cables that provide low attenuation characteristics may be used. However, such cables are relativity expensive, thus increasing the bill of material (BoM) of consumer electronics devices.

While the example provided in FIG. 1 include a laptop computer to facilitate understanding, aspects of the present disclosure may be used by any wireless device for wireless communication. For example, aspects of the present disclosure may be used for wireless communication by a tablet, a base station, an access point, a user-equipment or a station.

Figure 2:
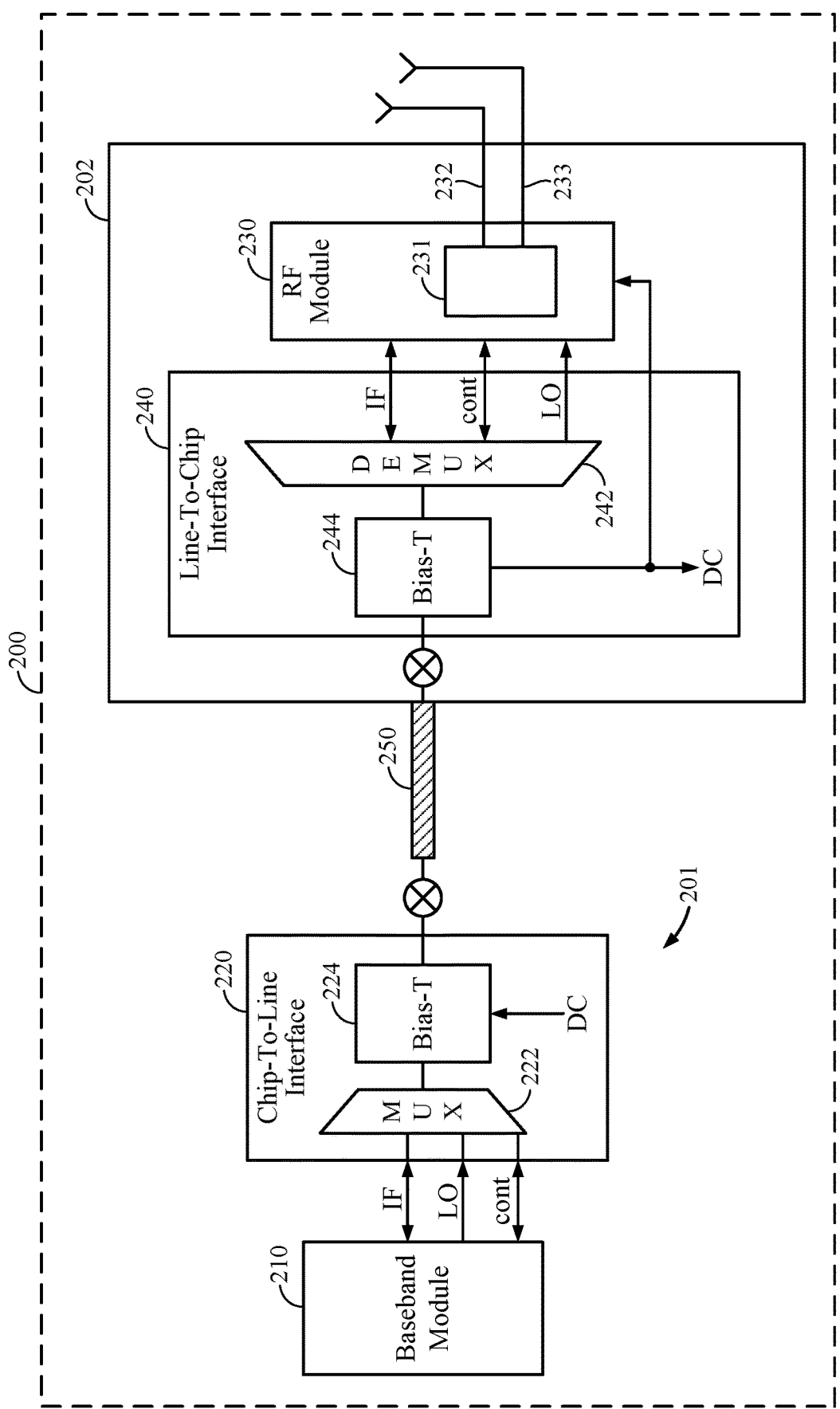
FIG. 2 illustrates an example radio frequency (RF) system, in accordance with certain aspects of the present disclosure.

FIG. 2 illustrates an example RF system 200 utilized to describe various aspects of the present disclosure. The RF system 200 includes a baseband module 210 coupled to a chip-to-line interface module 220. In addition, the RF system 200 includes an RF module 230 coupled to a line-to-chip interface unit 240. The RF module 230 comprises a RF circuitry 231 to perform up and down conversions of radio signals and to control the TX and RX active antennas 232 and 233. In certain aspects, each of the antennas 232 and 233 is a phase array antenna. The RF system 200 enables the efficient transmission and reception of signals in at least the 60 GHz band.

The baseband module 210 and RF module 230 are apart from each other and may be connected using a single transmission line 250 (e.g., a coax cable) through the interfaces 220 and 240. In certain aspects, the baseband and RF modules 210 and 230 are respectively located at the base and lid planes of a laptop computer.

At least four different signals may be simultaneously transferred over the transmission line 250 including, but not limited to, control, intermediate frequency (IF), and local oscillator source (LO). In some cases, a power signal may be transferred over the transmission line 250 as well. It should be noted that the IF and control signals are transferred over the line 250 in both directions. The control signal controls, at least, the switching of the TX and RX active antennas, the direction of the antenna (beam forming), and gain control. The LO signals may be used to synchronize the two modules and to perform up and down conversions of high frequency signals.

Each signal transferred over the transmission line 250 may have a different frequency band. In certain aspects, a frequency plan is described that enables the efficient transfer of the five signals over the transmission line 250. In accordance with an embodiment, the transmission line 250 is a standard micro coaxial cable. According to certain aspects, the transmission line 250 may be formed by fabricating a metal line on a multilayer substructure.

During the simultaneous transfer of the LO, IF, and control signals over the transmission line 250, the interface units 220 and 240 are used. The interface units 220 and 240 multiplex the various signals and impedance matches between the transmission line 250 and the PCBs to which the modules 210 and 230 are connected to.

As shown in FIG. 2, the chip-to-line interface unit 220 includes a multiplexer 222 and a Bias-T unit 224 and the line-to-chip interface unit 240 includes a demultiplexer 242 and a Bias-T unit 244. The multiplexer 222 multiplexes the IF signal, LO signal, and control signal to be output on a single output provided to the input of the Bias-T unit 224. In some cases, the Bias-T unit 224 also adds a DC voltage signal from a power source and outputs the signal to the transmission line 250. The multiplexer 222 also performs a demultiplexing operation to produce the IF signal(s) and control signal transferred from the RF module 230.

The demultiplexer 242 de-multiplexes the input received on the transmission line 250, to generate the control signal, IF signal, and LO signal. Prior to that, the Bias-T unit 244 may extract the DC voltage signal to power the RF module 230 if the input received on the transmission line includes a power signal. In some cases, the Bias-T 244 may extract the control signal from the input received on the transmission line 250, as will be described in more detail herein. The demultiplexer 242 also performs a multiplexing operation on the IF signal (results of a down conversion of the received RF signals) and control signal to be transferred to the baseband module 210.

In certain aspects, the multiplexer 222 and Bias-T unit 224 are integrated in the baseband module 210 which are embedded in an RFIC. In the same fashion, the demultiplexer 242 and Bias-T unit 244 may be integrated in the RF module 230, which is fabricated as an RFIC, as will be described in more detail herein. In certain aspects, the multiplexer 222 and demultiplexer 242 may be part of the baseband and RF modules respectively, thus are part of the RFICs. The Bias-T units 224 and 244 may be part of a mainboard 201 and an antenna board 202, respectively.

In certain aspects, the baseband module 210 and RF module 230 are fabricated on different substrates and connected using a transmission line (e.g., a cable). According to another embodiment, the RF and baseband modules are fabricated on the same substrate and are connected using a coaxial cable. In this embodiment, the techniques described herein for multiplexing the signals may also be applied.

Figure 3:
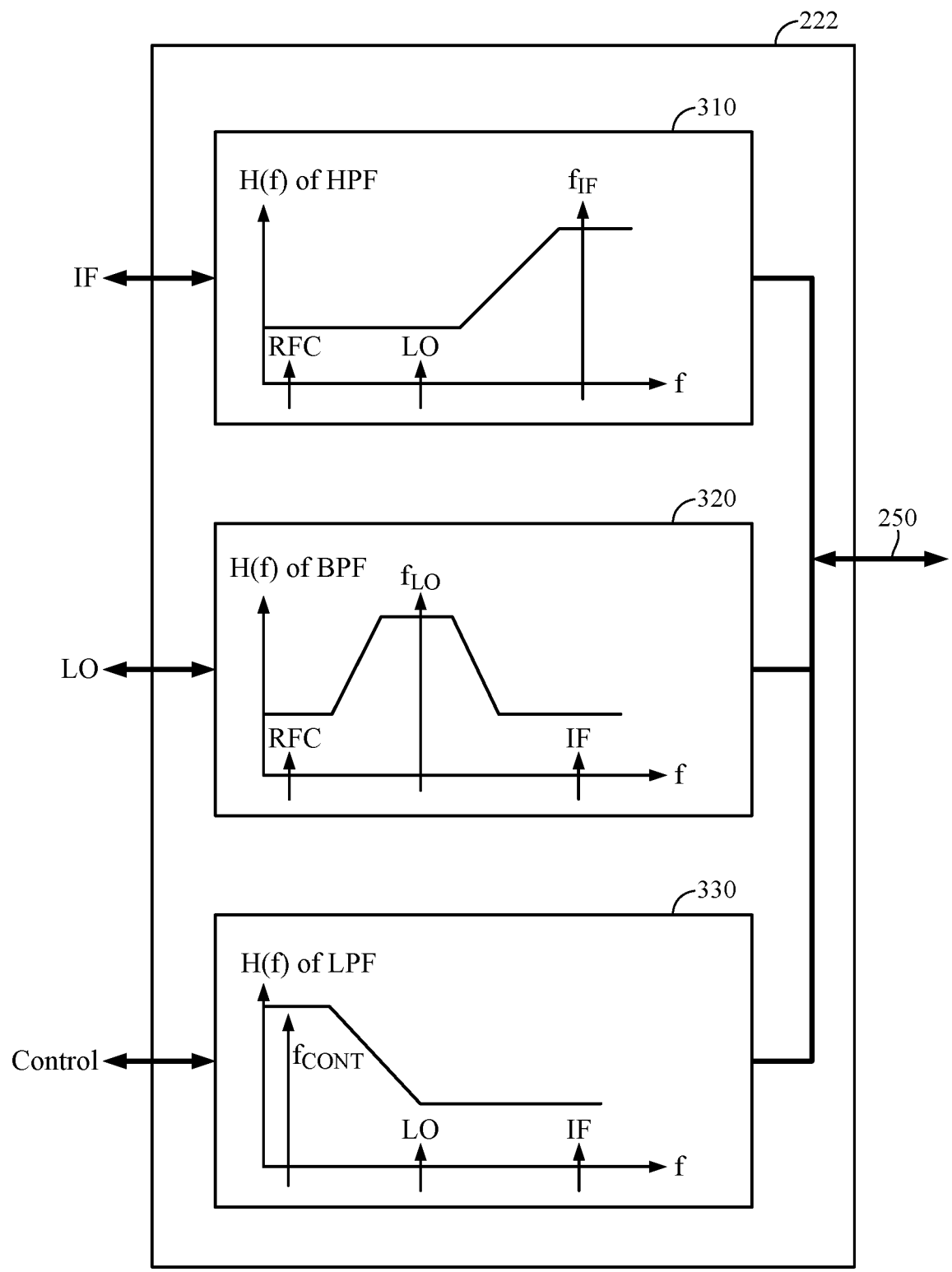
FIG. 3 illustrates an example multiplexer, in accordance with certain aspects of the present disclosure.

FIG. 3 shows a non-limiting block diagram of the multiplexer 222 constructed in accordance with one embodiment. The multiplexer 222 separates the frequency spectrum to three different frequency bands: $f_{IF}$, $f_{LO}$, and $f_{CTRL}$ to multiplex the LO signal, IF signal, and control signal in these bands respectively. Specifically, the multiplexer 222 includes a high-pass filter (HPF) 310, a base-pass filter (BPF) 320, and a low-pass filter (LPF) 330; each passes signals in the $f_{IF}$, $f_{LO}$, and $f_{CTRL}$ respectively.

While the description above refers to the laptop computer 100 as a reference example of a type of device that may implement the techniques presented herein, those of ordinary skill in the art will recognize that the techniques presented herein may also be implemented in a variety of other types of devices (e.g., such as mobile phones, desktop computer, household devices, etc.). Further, those of ordinary skill in the art will recognize that the form factor of the RF system 110 described above is provided merely as a reference example, and that the techniques presented herein may be applied to other configurations of the RF system 110.

Example Fast Beamforming Training

Certain aspects of the present disclosure provide improved techniques for beamforming training of multi-antenna systems. The techniques may help to substantially reduce the time used for beamforming training by simultaneously training multiple antennas.

In certain multi-antenna systems (e.g., mmWave systems), beamforming training typically involves the transmitter sending fixed pilots as the receiver trains its elements on the received signal. In some cases, the training may involve receiving many elements using a Hadamard matrix. In case of multiple antennas, but a single RF chain, then the training may take a substantial amount of time as each antenna is trained in sequence.

Aspects of the present disclosure, however, may take advantage of the presence, in many multi-array systems, of a detector per RF antenna. For example, aspects of the present disclosure propose using the detectors in the RF antenna to simultaneously train the multiple antennas, thus significantly improving efficiency and simplifying the training flow.

The techniques provided herein may reduce the amount of time by reducing the amount of time required for a beam refinement phase (BRP) in 802.11ad/ay/aj devices. Each BRP IE typically has substantial data (e.g., 38 bytes) which are sent using MCS0 or MCS1. The techniques provided herein may result in an advantage (e.g., of 4-5x) in time savings for the BRP-RX phase of massive-array with 8 antennas.

Figure 4:
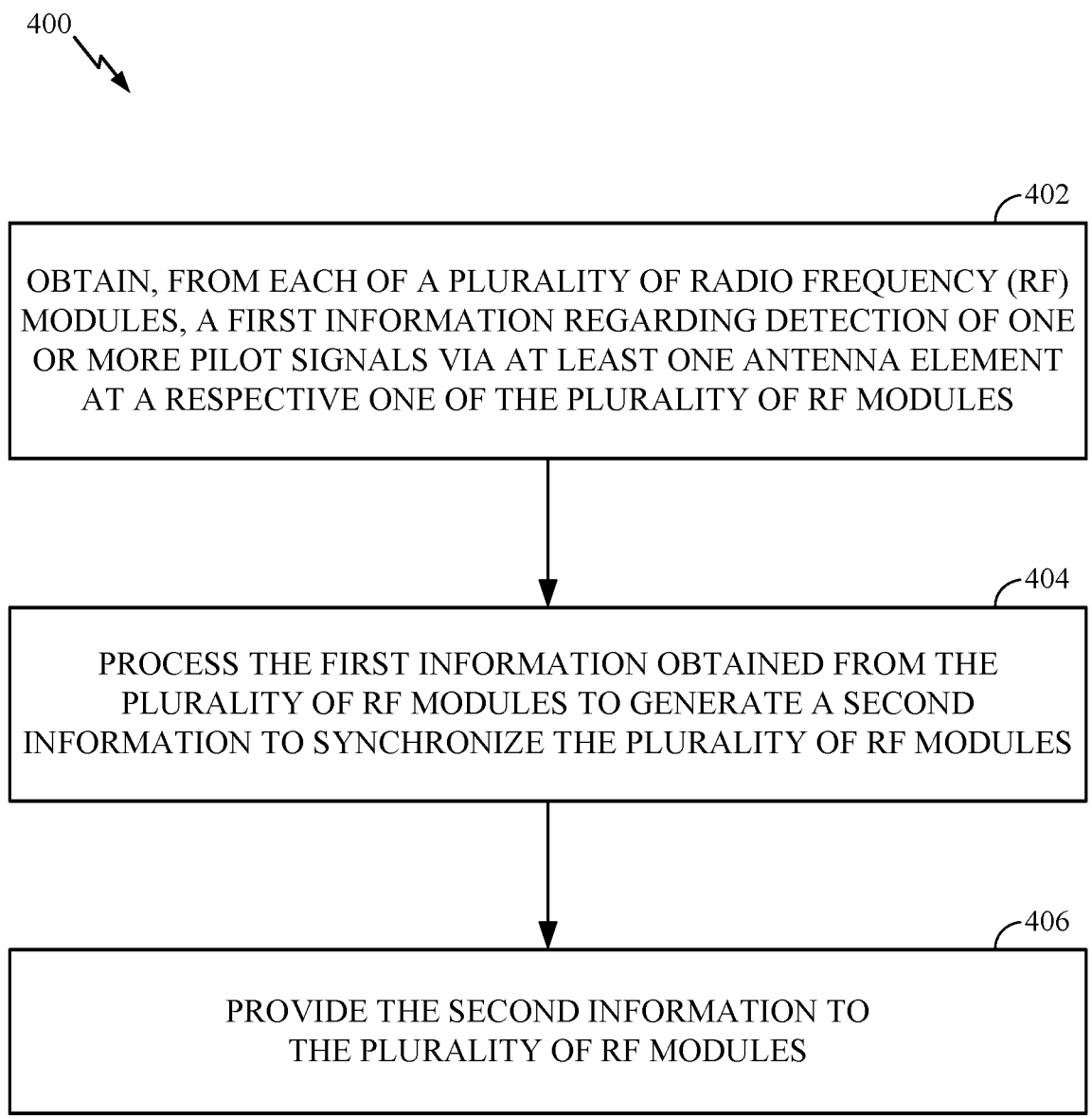
FIG. 4 is a flow diagram of example operations for wireless communications, in accordance with certain aspects of the present disclosure.

FIG. 4 is a flow diagram of example operations 400 for wireless communications, in accordance with certain aspects of the present disclosure. The operations 400 may be performed, for example, by a baseband module to simultaneously train multiple antenna elements of multiple RF modules.

The operations 400 begin, at 402, by obtain, from each of a plurality of radio frequency (RF) modules, first information regarding detection of one or more pilot signals via at least one antenna element at a respective one of the plurality of RF modules. At 404, the apparatus process the first information obtained from the plurality of RF modules to generate second information to synchronize the plurality of RF modules. At 406, the second information is provided to the plurality of RF modules.

Figure 5:
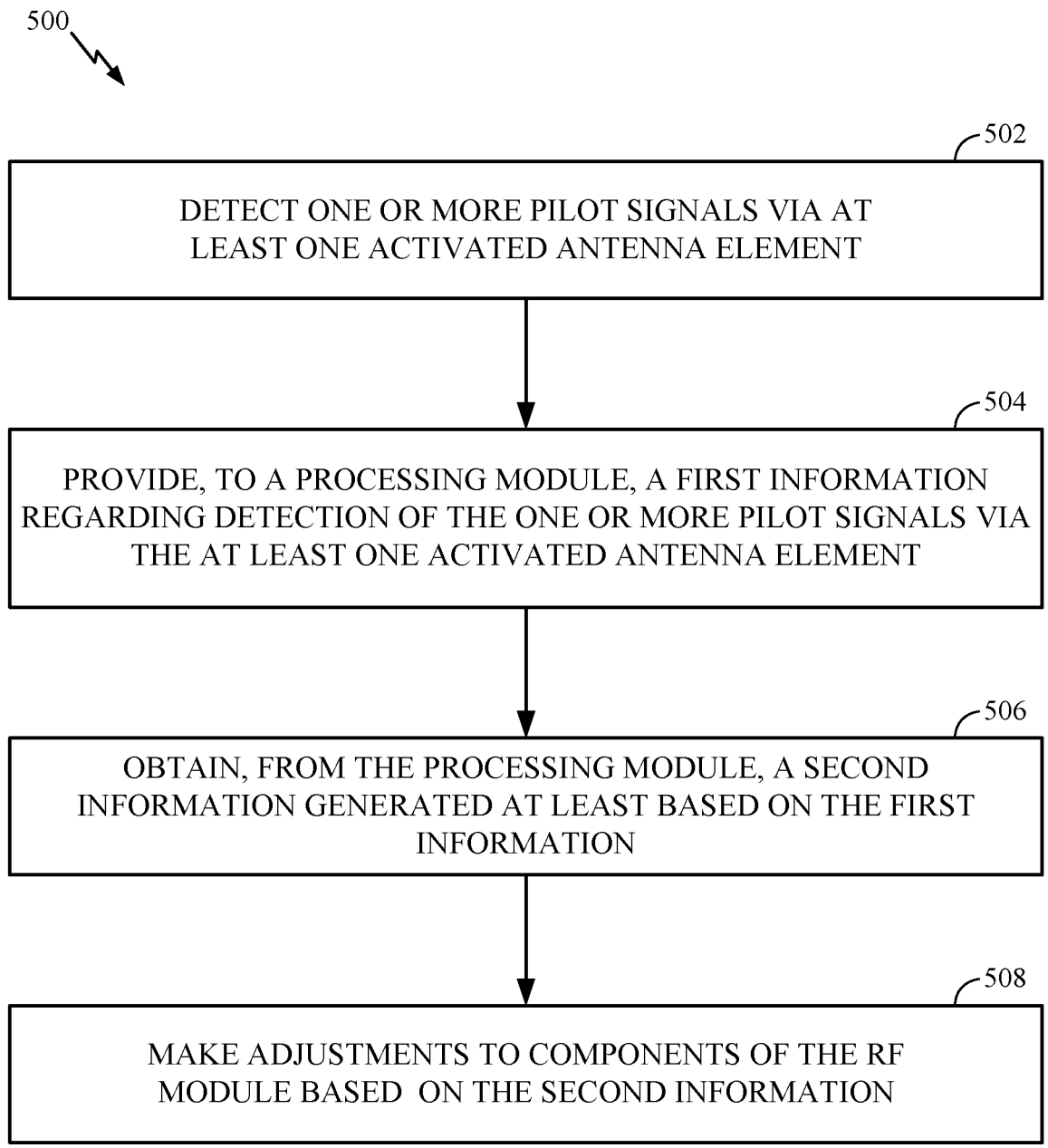
FIG. 5 is a flow diagram of example operations for wireless communications, in accordance with certain aspects of the present disclosure.

FIG. 5 is a flow diagram of example operations 500 for wireless communications, in accordance with certain aspects of the present disclosure. The operations 500 may be performed, for example, by an RF module being trained by a baseband module performing operations 400 described above.

The operations 500 begin, at 502, by detect one or more pilot signals via at least one activated antenna element. At 504, the apparatus provides, to a processing module, first information regarding the detection of the one or more pilot signals via the at least one activated antenna element. At 506, the apparatus obtains, from the processing module, second information generated at least based on the first information. At 508, the apparatus makes adjustments to components of the RF module based on the second information.

As will be described in greater detail below, in some cases, training operations may initiated, by a triggering message sent from the base band chip to the one or more RF modules. The triggering message may be sent using a broadcast to all RF modules at the same time, to start off at the same time. The triggering message may comprise additional information, for example, regarding the carrier frequency offset associated with (e.g., between) the transmitter and the receiver (e.g., in PPM), as estimated in the base band chip during frame decoding. The triggering message may also comprise an index to a sector for use as pilots in the RF processing and toggling.

Figure 6:
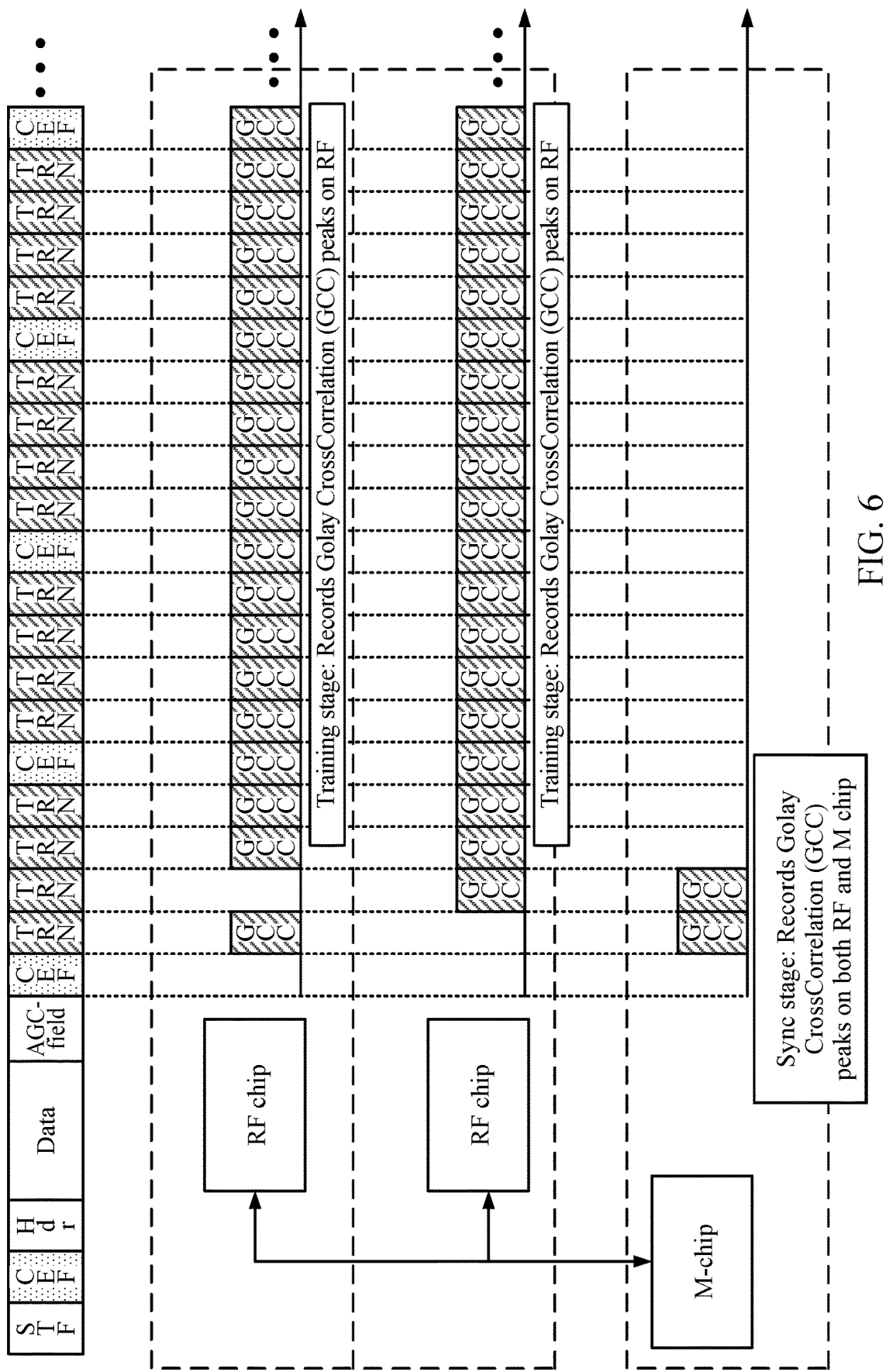
FIG. 6 illustrates an example training of a multi-antenna system, in accordance with certain aspects of the present disclosure.

FIG. 6 illustrates an example of simultaneous training of multiple RF modules (labeled RF chips), by a baseband module (labeled as a modem or "M-chip"). In one or more cases, operations that make up the training of the multiple RF modules may be performed by the baseband module. In some cases, another processor or a second baseband module may be provided that communicates with the baseband module and the RF modules and performs one or more of the operations. As illustrated in FIG. 6, the training consists of performing Golay cross-correlation using at least one Golay cross-correlator (at each of the RF modules), based on directional pilot signals sent as training (TRN) fields from a transmitter, and picking the right tap for the training. These detected peaks may be sent from each RF module to base band chip for joint processing of the results.

According to certain aspects, this joint processing may involve, among other things, tracking which corrects the frequency offset and the phase noise difference between the transmitter and receiver. In some cases, the joint processing may involve leveling the antenna gains between the RF antennas. In some cases, the joint processing may involve deciding on the best array pattern (e.g., an omnidirectional or directed pattern) setting for tracking pilots. The results of this joint processing may be included in the second information. Accordingly, in some cases, the second information may include information allowing at least one of the RF modules or a baseband module to correct for at least one of frequency offset or timing offset between each of the RF modules or the baseband module and a transmitter of the pilot signals. In some cases, the second information may include information allowing at least one of the RF modules or a baseband module to correct for phase noise difference between each of the RF modules or the baseband module and a transmitter of the pilot signals.

In some cases, time synchronization between RF modules may be performed in the BB module, but tracking may also track in RF modules. In some cases, the BB module may control toggling of antennas. In some cases, the toggling may involve selective activation. In some cases, selective activation may include a processing system that generates third information to trigger each RF module to activate or deactivate one or more antenna elements for pilot signal detection. In some cases, the antennas may be antennas to be trained.

The baseband module may perform initial frequency offset and timing correction, which may be sent from the baseband module to each RF module. The RF module may then use this information for phase estimation. The BB module and/or RF modules may also perform an additional phase of synchronization among all antennas.

In general, the BB module may measure all RF antennas, each at a time. For example, the BB module may measure a single activated antenna element from each antenna activated at a time with the remaining antenna deactivated. From this measurement, the BB module may synchronize the entire training between antennas of each RF module.

Figure 7A:
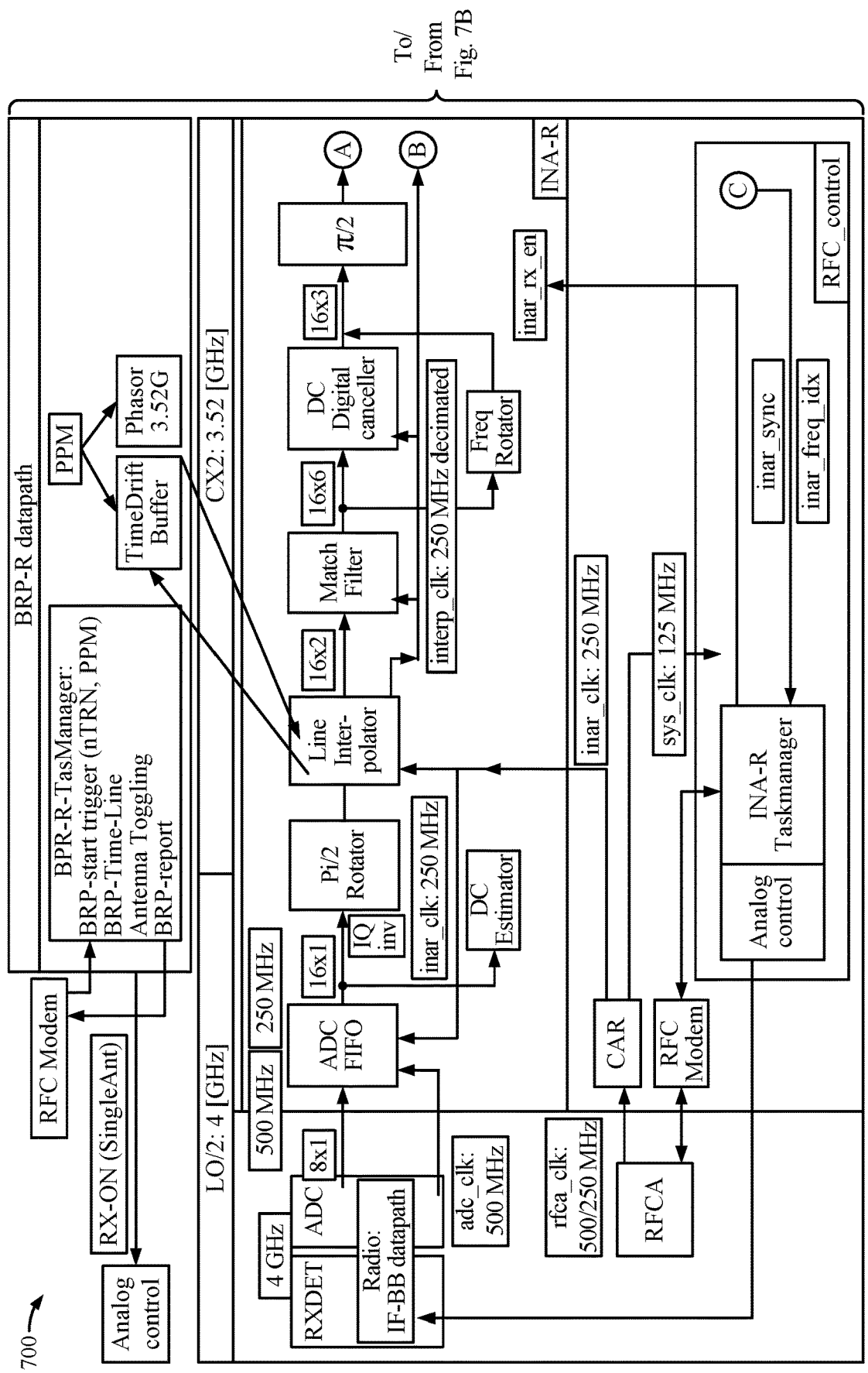
FIGS. 7A and 7B illustrate an example data path for training of a multi-antenna system, in accordance with certain aspects of the present disclosure.
Figure 7B:
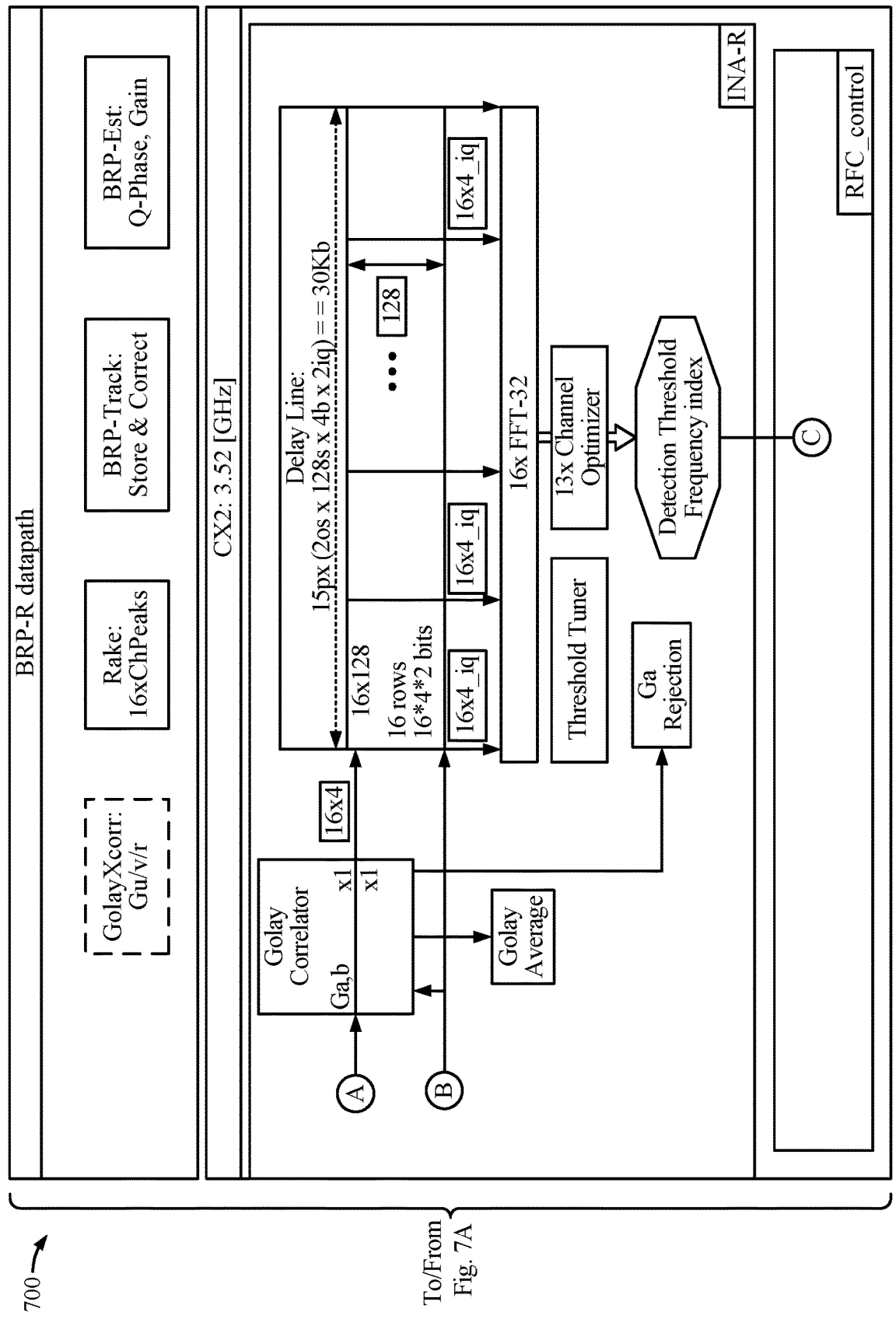

As illustrated in FIGS. 7A and 7B, a BB module 700 may control (via a trigger message) all antennas to start toggling at the same time. As noted above, such a trigger message may be broadcast to all RF modules and may comprise additional information (e.g., carrier frequency offset and/or a sector index) The RF modules may then send a BRP report or one or more BRP reports (e.g., with detected peaks) to the BB module, allowing the BB module to perform synchronization between the RF modules. In one or more cases, each BRP report may include first information regarding detection of a pilot signal from a single antenna element or sector. In some cases, the BRP report may include information regarding one or more taps of a Golay cross-correlator of the RF module with detection peaks of the pilot signals. The information regarding one or more taps of a Golay cross-correlator may include an estimate of a phase of one or more of the detection peaks. By controlling training of multiple RF modules in this manner, the techniques described herein may speed training significantly relative to conventional techniques that train a single RF chain at a time.

Figure 8:
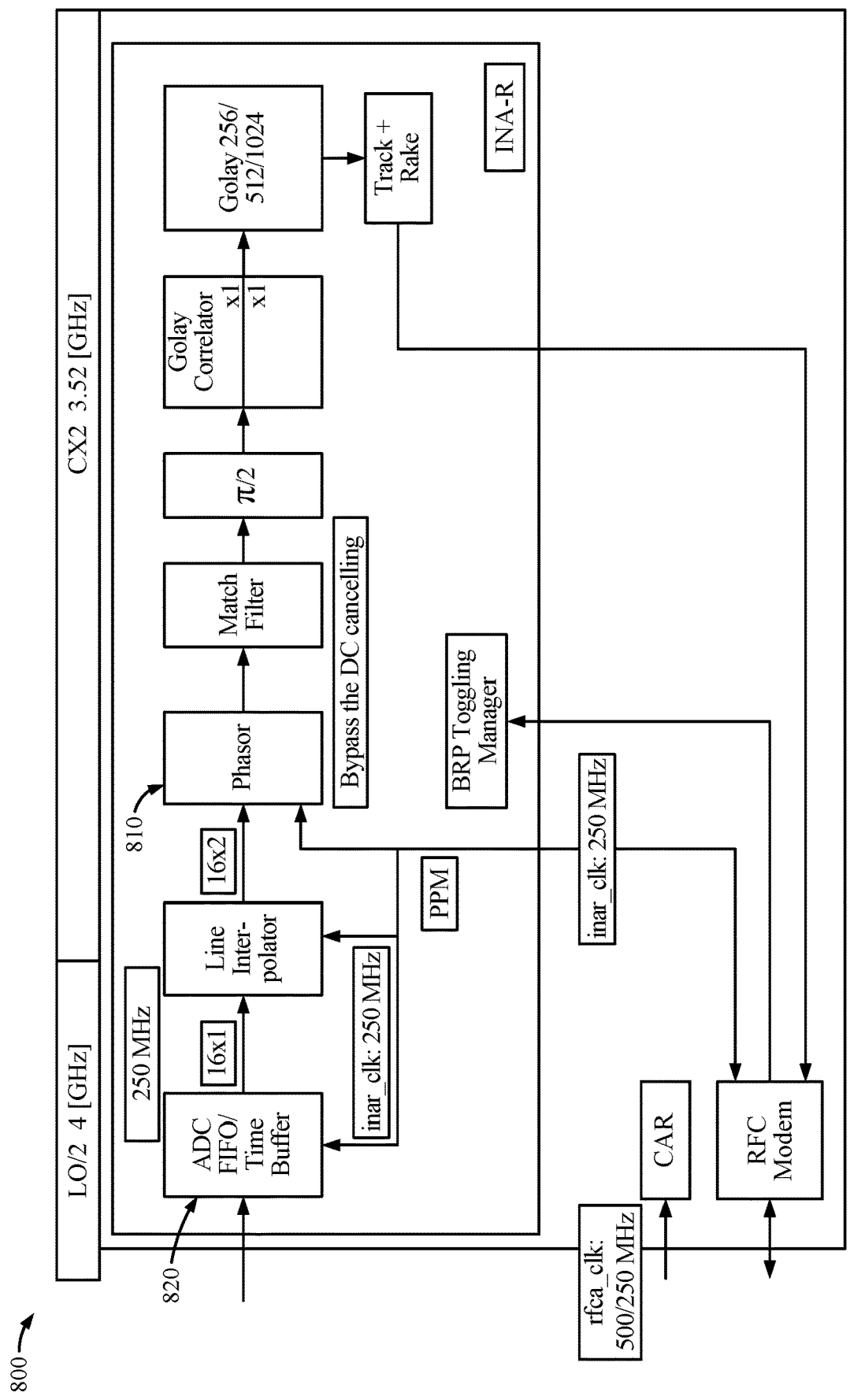
FIG. 8 illustrates example components of an RF module, in accordance with aspects of the present disclosure.

FIG. 8 illustrates another implementation 800 with components allowing for the performing of tracking in the RF module. As illustrated, an additional phasor 810 and timebuffer 820 may be used. As noted above, a triggering message (e.g. with PPM and OMNI sector) may be provided to all RF modules.

Figure 9:
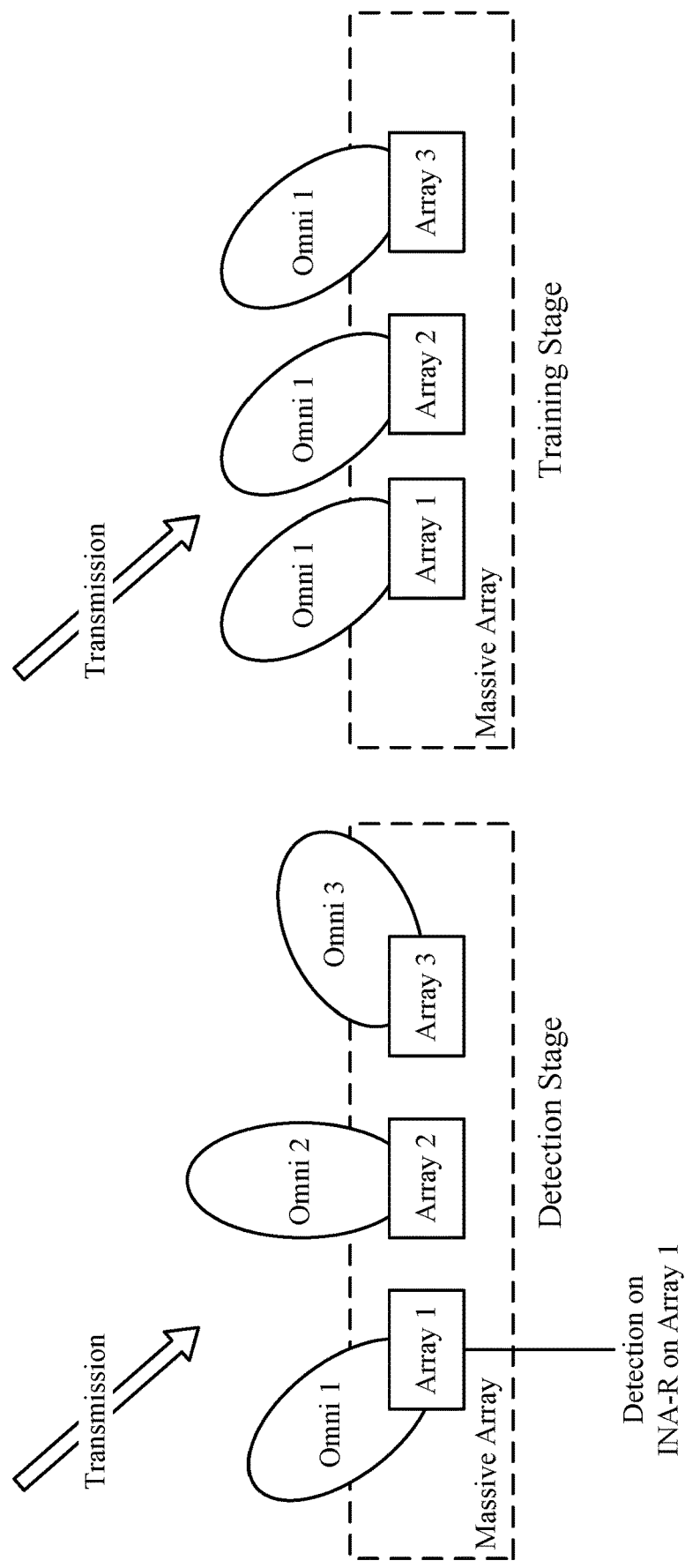
FIG. 9 illustrates example detection and training phases of a multi-antenna system, in accordance with aspects of the present disclosure.

As illustrated in FIG. 9, during a detection stage, different arrays may be activated and set to different omni directions, which may speed detection. After detection of a certain omni setting, different RF modules may be set to the same certain omni setting that was detected. For example, as shown in FIG. 9, during the detection stage the arrays 1, 2, and 3 may start with different omni directions 1, 2, and 3, respectively. As shown the detection of a certain omni setting occurs in this example at array 1. Accordingly, as shown during the training stage, all three arrays may then be set to Omni 1 as illustrated. In some cases one or antennas may be deactivated for pilot signal detection.

Figure 10:
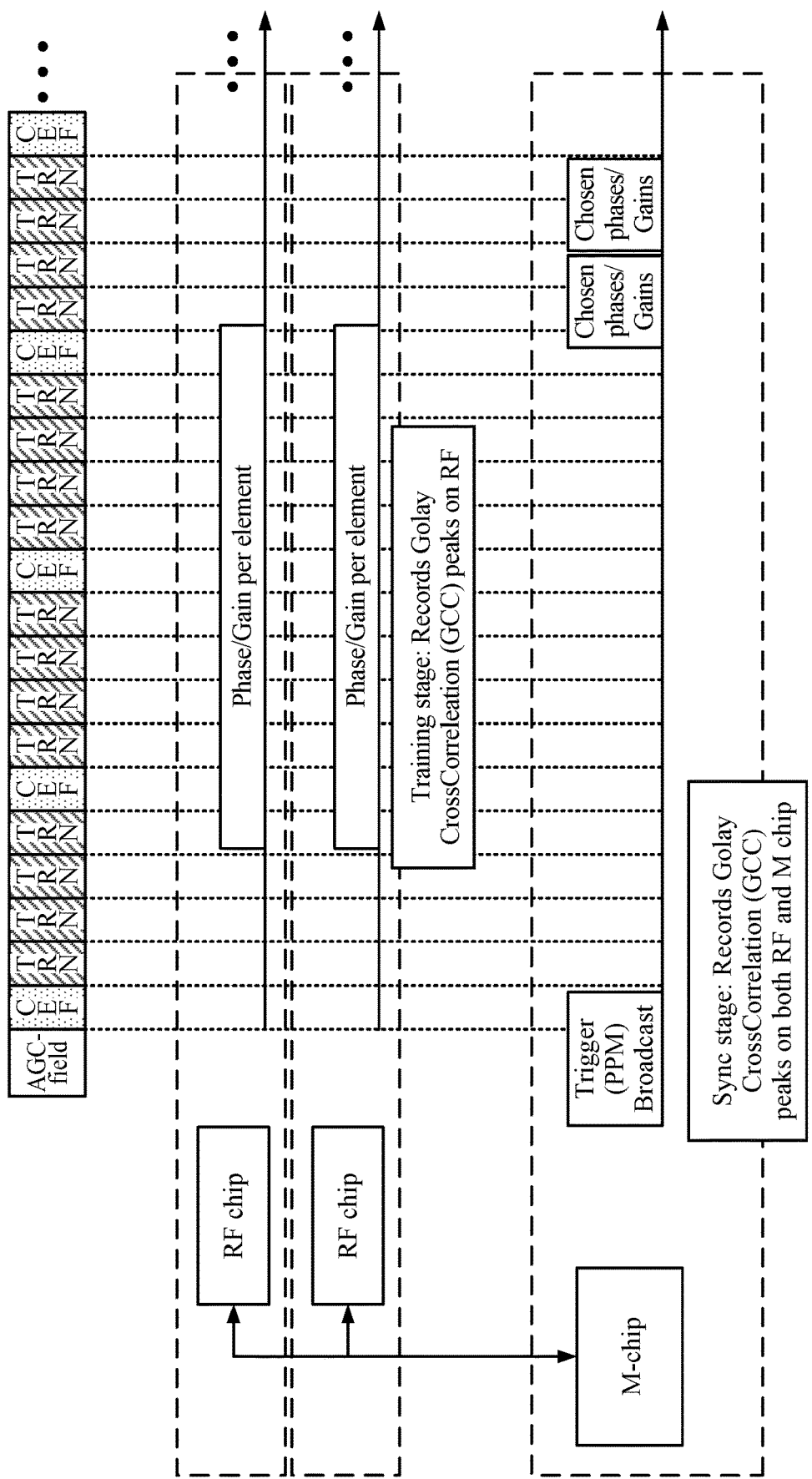
FIG. 10 illustrates a first example training of a multi-antenna system, in accordance with certain aspects of the present disclosure.
Figure 11:
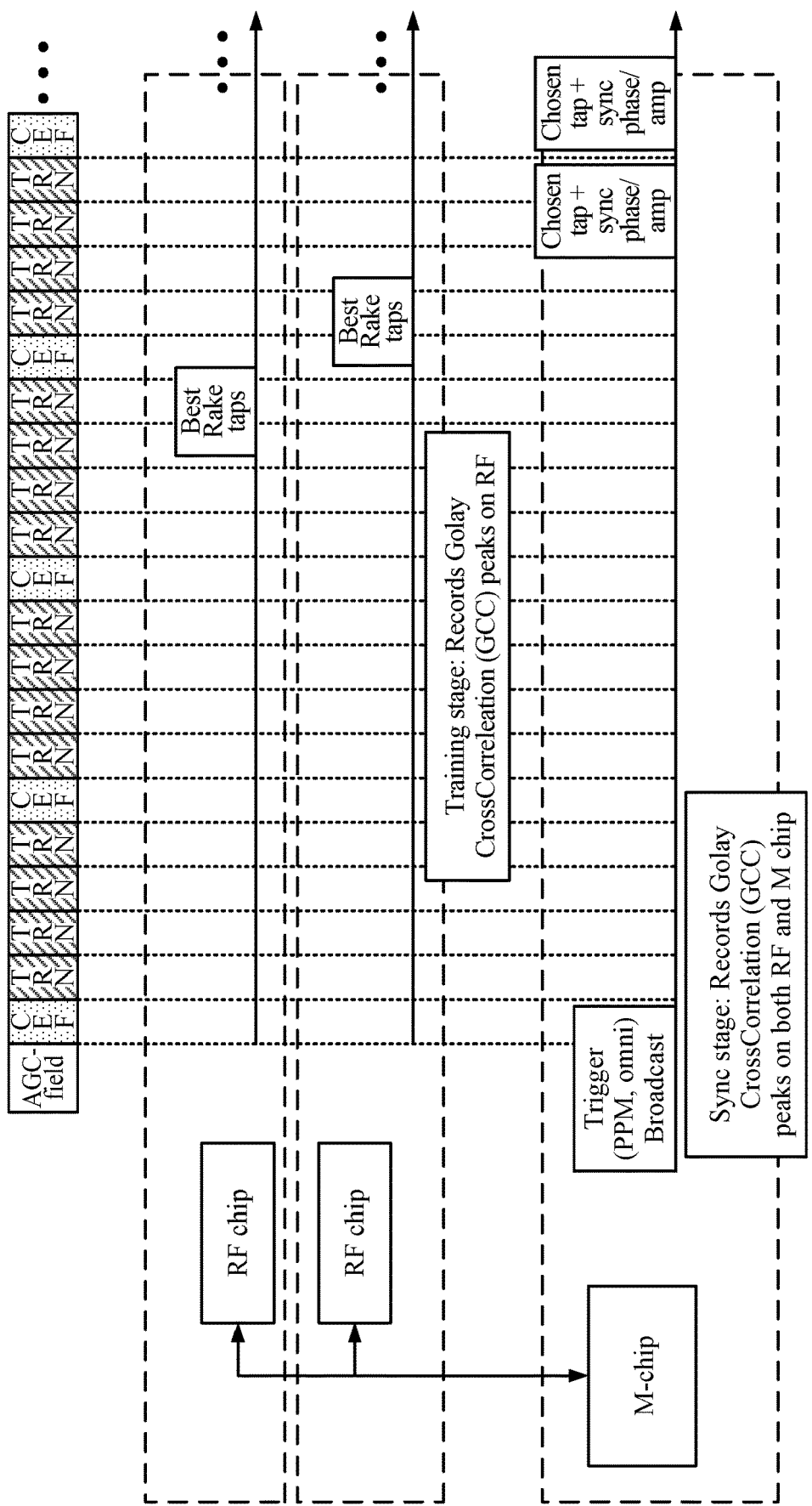
FIG. 11 illustrates a second example training of a multi-antenna system, in accordance with certain aspects of the present disclosure.

As illustrated in FIG. 10, each RF module may send Golay cross-correlation peaks for each tap per element for each TRN frame to the baseband module. Phases and gains may be determined at the baseband module. In some cases, as illustrated in FIG. 11, however, tracking may be implemented in the RF module and the RF modules may just send information for the best taps. In such cases, the baseband module may determine phases and gains for the reported taps. In any case, multiple taps may be processed in parallel, for the same TRN frames. This processing may be useful for first arrival correction interference alignment.

As illustrated in FIG. 12, depending on a particular implementation, the amount of processing performed at each RF module, and amount of information provided may vary. For example, according to one option shown in the first column of the table of FIG. 12, all (IQ) measurements (for each tap) may be provided to the BB module, while tracking is performed at the BB module only. According to a second option shown in the second column of the table of FIG. 12, all (IQ) measurements (for each tap) may be provided to the BB module, but tracking is performed at the RF modules, while phases are determined at the BB module. According to a third option shown in the third column of the table of FIG. 12, only gain measurements for a limited number of taps (e.g., 16) may be provided to the BB module, and tracking may be performed and phases are determined at the RF modules.

Synchronization for the multi-array antenna system may be performed as follows in accordance with one or more cases. For all RF modules, same TRN is received by the baseband module (M-chip) and the RF modules (R chip) for the Omni element. Track and cross-correlation may be performed on both receptions. In implementation option 1, described above, track is done twice in the M-chip. In implementation options 2 and 3, track is done once in the M-chip and once in the RF-chip. Cross-correlation may be done both in the M-chip and RF-chip. Peak indices [7 bit index inside the CES] for both receptions may be taken for the pi/2+Phasor compensation. The reception may be synchronized by using the strongest peak from M and RF. For example, this strongest peak may be obtained by summing the 16 taps from all RF antennas or up to 128 taps when each array receives different reception. In some cases, the strongest tap may be obtained as the following sum:

$$StrongestTap = \text{argmax}_j \sum_{i=1}^{8 \text{ or } 256} |h_{ij}|$$

The phase correction and gain correction may be used to adjust components to align the phase and gain in the RF modules. In one or more cases, adjustments of one or more antenna weights of the RF module may be provided to enable the antenna array pattern.

Synchronization for the multi-array antenna system may be performed as follows. For all RF modules, same TRN is received by the baseband module for the Omni element for each RF antenna sequentially. Track and cross-correlation may be performed on both receptions. The reception may be synchronized by using the strongest peak as selected by the M from the receptions in the synchronization stage or by combining receptions done in all RFs. For example, this strongest peak may be obtained by summing the 16 taps from all RF antennas or up to 128 taps when each array receive different reception. In some cases, the strongest tap may be obtained as the following sum:

$$StrongestTap = \text{argmax}_j \sum_{i=1}^{8 \text{ or } 256} |h_{ij}|$$

In another embodiment the strongest peak may be chosen from the strongest peak of the cross correlation output during the omni reception at the base band chip.

The phase correction and gain correction may be used to adjust components to align the phase and gain in the RF modules.

Generally, a mainboard may comprise, for example, a circuit board that includes a baseband module, and an antenna board may comprise, for example, a circuit board that includes an RF module. An RF module may comprise, for example, a module that includes RF front end circuitry for generating RF signals. A baseband module may comprise, for example, circuitry configured to generate baseband signals. A regulator may comprise, for example, a circuit used to regulate a voltage (e.g., a linear regular or a switch mode regulator). A DC-to-DC regulator may comprise, for example, a regulator that receives an input DC signal and generates a regulated DC output signal. Bias-T circuit may comprise, for example, a circuit configured to combine (or split) high-frequency and low-frequency signals. A low-pass filter (LPF) may comprise, for example, a circuit for passing low-frequency signals and blocking high-frequency signals.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

Figure 4A:
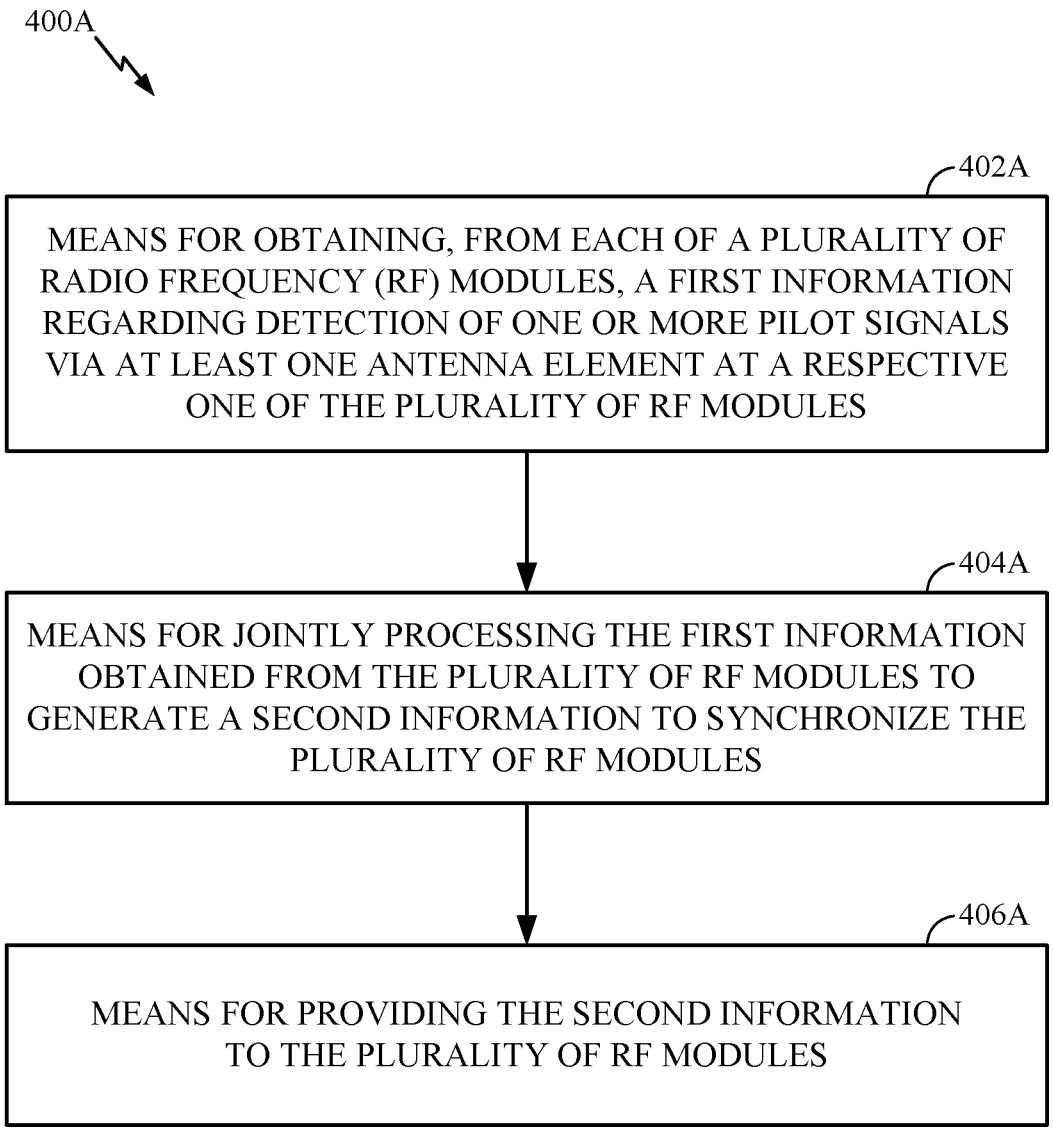
FIG. 4A illustrates example means capable of performing the operations shown in FIG. 4.
Figure 5A:
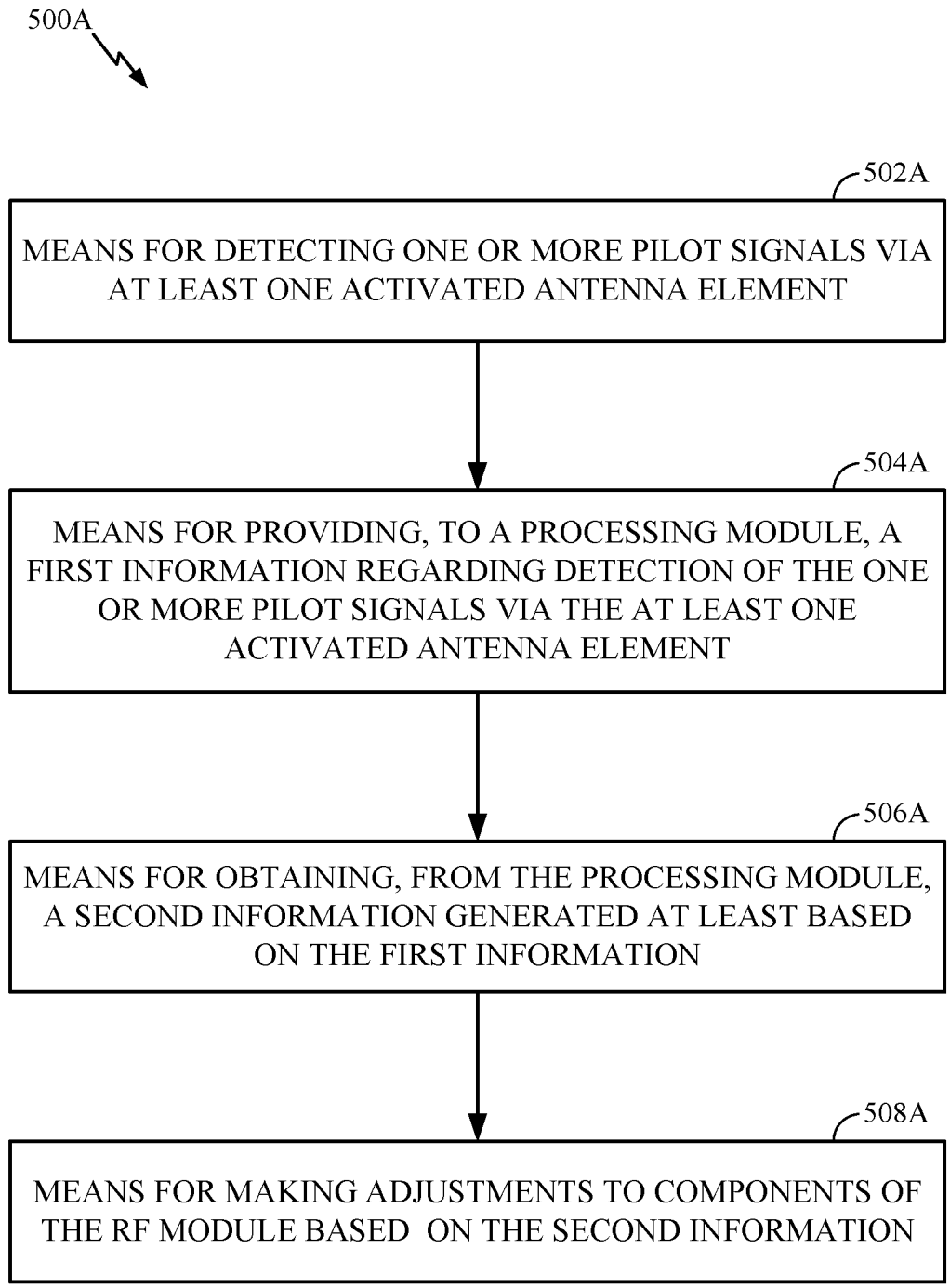
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4, and operations 500 illustrated in FIG. 5, correspond to means 400A illustrated in FIG. 4A, means 500A illustrated in FIG. 5A, respectively.

For example, means for obtaining, means for providing, or means for detecting may include an RF module 130 or an IF module 120 as illustrated in FIG. 1, an RF module or baseband module 210 as illustrated in FIG. 2, and/or an RF chip or M-chip as illustrated in FIG. 6, 10, or 11. Means for processing, means for estimating, means for adjusting, means for including, means for activating, or means for making may comprise a processing system, which may include one or more processors, such as the RF module 130 or IF module 120 illustrated in FIG. 1, the baseband module 210 or the RF module 230 illustrated in FIG. 2, the RF chip or M-chip illustrated in FIG. 6, 10, or 11, and/or the BB module 700 or implementation 800 as illustrated in FIGS. 7A, 7B, and 8, respectively.

According to certain aspects, such means may be implemented by processing systems configured to perform the corresponding functions by implementing various algorithms (e.g., in hardware or by executing software instructions) described above for providing an immediate response indication in a PHY header. For example, an algorithm for outputting a first frame for transmission to another apparatus at a first time, an algorithm for obtaining, at a second time, a second frame transmitted by the other apparatus in response to the first frame, and an algorithm for generating a third frame for transmission to the other apparatus via the transmit interface, the third frame including information indicating a difference between the first time and the second time and an indication of at least one of an angle of departure of the first frame or an angle of arrival of the second frame. In another example, an algorithm for outputting a second frame for transmission to another apparatus in response to a first frame received from the other apparatus, an algorithm for obtaining a third frame transmitted by the other apparatus in response to the second frame, the third frame including information indicating a difference between the first time and the second time and an indication of at least one of an angle of departure of the first frame or an angle of arrival of the second frame, and an algorithm for estimating a location of the apparatus relative to the other apparatus based, at least in part, on the difference between the first time and the second time and at least one of the angle of departure of the first frame or the angle of arrival of the second frame.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a STA, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for outputting a first frame for transmission to another apparatus at a first time, instructions for obtaining, at a second time, a second frame transmitted by the other apparatus in response to the first frame, and instructions for generating a third frame for transmission to the other apparatus via the transmit interface, the third frame including information indicating a difference between the first time and the second time and an indication of at least one of an angle of departure of the first frame or an angle of arrival of the second frame. In another example, instructions for outputting a second frame for transmission to another apparatus in response to a first frame received from the other apparatus, instructions for obtaining a third frame transmitted by the other apparatus in response to the second frame, the third frame including information indicating a difference between the first time and the second time and an indication of at least one of an angle of departure of the first frame or an angle of arrival of the second frame, and instructions for estimating a location of the apparatus relative to the other apparatus based, at least in part, on the difference between the first time and the second time and at least one of the angle of departure of the first frame or the angle of arrival of the second frame.

Further, it should be appreciated that modules and/or other appropriate means for performing the methods and techniques described herein can be downloaded and/or otherwise obtained by a STA and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A wireless communication device comprising:
   a plurality of radio frequency (RF) modules, each RF module configured to:
      detect one or more pilot signals received via a respective single activated antenna element of a plurality of antenna elements or a respective single sector, and
      generate a beam refinement phase (BRP) report including first information that is based on the detected one or more pilot signals received via the respective antenna element or sector; and
   a processing system configured to:
      receive the BRP reports,
      generate second information based on the first information, and
      adjust components of one or more of the RF modules based on the second information.

2. The apparatus of claim 1, wherein:
   each RF module comprises a Golay cross-correlator; and
   the first information includes information regarding one or more taps of the Golay cross-correlator with detection peaks.

3. The apparatus of claim 2, wherein:
   the processing system is further configured to estimate a phase of one or more of the detection peaks; and
   the information regarding the one or more taps of the Golay cross-correlator comprises the estimate of the phase of one or more of the detection peaks.

4. The apparatus of claim 1, wherein:
   the second information comprises information regarding at least one of a frequency offset or a timing offset between one or more of the RF modules and a transmitter of the one or more pilot signals; and
   the adjustment of the components of the one or more RF modules comprises making at least one of timing or frequency adjustments to the components of one or more of the RF modules based on the second information.

5. The apparatus of claim 1, wherein:
   the second information comprises information regarding a phase noise difference between one or more of RF modules and a transmitter of the one or more pilot signals; and
   the adjustment of the components of the one or more RF modules comprises adjusting gain or phase components of one or more of the RF modules based on the second information.

6. The apparatus of claim 1, wherein;
   the second information comprises information allowing the one or more RF modules to adjust an antenna gain or phase; and
   the adjustment of the components of the one or more RF modules comprises adjusting antenna weights of one or more of the RF modules based on the second information.

7. The apparatus of claim 1, wherein:
   the second information comprises information indicating an antenna array pattern setting for one or more of the RF modules; and the adjustment of the components of the one or more RF modules comprises adjusting one or more antenna weights of one or more of the RF modules to enable the antenna array pattern.

8. The apparatus of claim 1, wherein the processing system is further configured to transmit third information to the plurality of RF modules that triggers the RF modules to activate or deactivate the respective antenna elements to receive the one or more pilot signals.

9. The RF module of claim 8, wherein:
the third information includes at least one of: an index for a sector or a carrier frequency offset associated with a transmitter of the one or more pilot signals and each of one or more of the RF modules; and
each RF module is configured to configure a respective detector based on the carrier frequency offset or the sector to detect the one or more pilot signals.

10. A method for wireless communication, comprising:
detecting, by each of a plurality of radio frequency (RF) modules, one or more pilot signals received via a respective single activated antenna element of a plurality of antenna elements or a respective single sector;
generating, by each of the RF modules, a beam refinement phase (BRP) report including first information that is based on the detected one or more pilot signals received via the respective antenna element or sector;
obtaining, by a processing system from the RF modules, the BRP reports;
generating, by the processing system, second information based on the first information; and
adjusting components of one or more of the RF modules based on the second information.

11. The method of claim 10, wherein:
the detecting by each of the RF modules comprises detecting, by a respective Golay cross-correlator, the one or more pilot signals; and
the first information includes information regarding one or more taps of the Golay cross-correlator with detection peaks.

12. The method of claim 11, further comprising estimating a phase of one or more of the detection peaks, wherein the information regarding the one or more taps of the Golay cross-correlator comprises the estimate of the phase of one or more of the detection peaks.

13. The method of claim 10, wherein:
the second information comprises information regarding at least one of a frequency offset or a timing offset between one or more of the RF modules and a transmitter of the one or more pilot signals; and
the adjustment of the components of the one or more RF modules comprises making at least one of timing or frequency adjustments to the components of one or more of the RF modules based on the second information.

14. The method of claim 10, wherein:
the second information comprises information regarding a phase noise difference between one or more of the RF modules and a transmitter of the one or more pilot signals; and
the adjustment of the components of the one or more RF modules comprises adjusting gain or phase components of one or more of the RF modules based on the second information.

15. The method of claim 10, wherein;
the second information comprises information allowing the one or more RF modules to adjust an antenna gain or phase; and
the adjustment of the components of the one or more RF modules adjusting antenna weights of one or more of the RF modules based on the second information.

16. The method of claim 10, wherein:
the second information comprises information indicating an antenna array pattern setting for one or more of the RF modules; and
the adjustment of the components of the one or more RF modules comprises adjusting one or more antenna weights of one or more of the RF modules to enable the antenna array pattern.

17. The method of claim 10, further comprising:
transmitting third information to the plurality of RF modules that triggers the RF modules to activate or deactivate the respective antenna elements to receive the one or more pilot signals; and
activating or deactivating the antenna elements based on the third information.

18. The method of claim 17, wherein:
the third information includes at least one of: an index for a sector or a carrier frequency offset associated with a transmitter of the one or more pilot signals and each of one or more of the RF modules; and
each of the RF modules is configured to configure a respective detector based on the carrier frequency offset or the sector to detect the one or more pilot signals.

* * * * *